(12) United States Patent
Aizenberg et al.

(10) Patent No.: US 9,930,130 B2
(45) Date of Patent: *Mar. 27, 2018

(54) PROCESSING HYBRID DATA USING A SINGLE WEB CLIENT

(71) Applicant: International Business Machines Corporation, Armonk, NY (US)

(72) Inventors: Cirill Aizenberg, Nesher (IL); Anton Aleksandrov, Austin, TX (US); Vitaly Meytin, Hadera (IL); Gal Shachor, Yokneam (IL); Arie Shifer, Ra'ananna (IL); Issahar Weiss, Givat Shmuel (IL); Uri Zonens, Tel Aviv (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 296 days.

This patent is subject to a terminal disclaimer.

(21) Appl. No.: 14/818,391

(22) Filed: Aug. 5, 2015

(65) Prior Publication Data

US 2016/0164994 A1 Jun. 9, 2016

Related U.S. Application Data

(63) Continuation of application No. 14/563,439, filed on Dec. 8, 2014, now Pat. No. 9,648,124.

(51) Int. Cl.
*G06F 15/16* (2006.01)
*H04L 29/08* (2006.01)
*H04L 29/06* (2006.01)
*G06F 17/30* (2006.01)

(52) U.S. Cl.
CPC .... *H04L 67/2823* (2013.01); *G06F 17/30427* (2013.01); *G06F 17/30893* (2013.01); *H04L 67/02* (2013.01); *H04L 67/16* (2013.01); *H04L 67/42* (2013.01); *H04L 69/08* (2013.01)

(58) Field of Classification Search
CPC .......... G06F 17/3043; G06F 17/30427; H04L 67/2823; H04L 67/42; H04L 69/08
USPC ....................................................... 709/246
See application file for complete search history.

(56) References Cited

U.S. PATENT DOCUMENTS

| | | | |
|---|---|---|---|
| 8,676,995 B1* | 3/2014 | Andreasen | H04N 21/4227 340/4.11 |
| 8,954,989 B1* | 2/2015 | Colton | G06F 9/54 709/203 |
| 9,256,641 B1* | 2/2016 | Zlatnik | G06F 17/30442 |

OTHER PUBLICATIONS

Cirill Aizenberg, et al., Pending U.S. Appl. No. 14/563,439 entitled "Processing Hybrid Data Using a Single Web Client" filed Dec. 8, 2014.
List of IBM Patents or Patent Applications Treated As Related (Appendix P), Filed Aug. 5, 2015, 2 pages.

* cited by examiner

*Primary Examiner* — Phuoc Nguyen
(74) *Attorney, Agent, or Firm* — Cantor Colburn LLP

(57) ABSTRACT

According to an aspect, techniques for processing hybrid data include receiving a web request and translating the web request into a translated native request. The translated native request and a native request are sent to a server via a single web client. A response is received from the server via the single web client. It is determined whether the response corresponds to the translated native request or to the native request.

7 Claims, 5 Drawing Sheets

PROCESSING HYBRID DATA USING A SINGLE WEB CLIENT

DOMESTIC PRIORITY

This application is a continuation of U.S. patent application Ser. No. 14/563,439, filed Dec. 8, 2014, the content of which is incorporated by reference herein in its entirety.

BACKGROUND

The present techniques relate to processing data, and more specifically, to processing hybrid data such as data to be processed in mobile applications.

SUMMARY

Embodiments include a method, system, and computer program product for processing hybrid data. In one aspect, a method includes receiving a web request and translating the web request into a translated native request. The translated native request and a native request are sent to a server via a single web client. A response is received from the server via the single web client. It is determined whether the response corresponds to the translated native request or to the native request.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Applications in modern devices such as mobile devices may process hybrid data of hybrid applications separately. Hybrid applications, as used herein, refer to applications that include both native business logic and web business logic. For example, native business logic may be written in a programming language such as Java® or Objective-C®, among others. Web business logic may be written in a different programming language such as JavaScript®, among others. Hybrid data, as used herein, includes native requests and web requests and any server responses to those requests. For example, a hybrid application may have native business logic and web business logic. Each of these types of logic may send a request to a server. The separate requests may cause a server to detect two separate web clients with two different states. This may result in, for example, multiple login responses from the server.

According to embodiments of the present disclosure, a translation module can be used to process hybrid data. In some embodiments, the translation module can receive web data such as web requests from a web communication module, translate the web requests into translated native requests, and send the translated native requests to a native communication module for further processing. In some embodiments, the native communication module may send native requests from native business logic and translated native requests to a web client. In some embodiments, the web client may include a web state. For example, the web state may include a state of a web client as modified by native requests and web requests and responses to the native requests and web requests. Thus, the web business logic and the native business logic may share the same client and web state, without synchronizing two separate web states. Regardless of the request type, a single state can be maintained for the application, and might be updated by both requests and responses. For example, a mobile application having both web business logic and native business logic components may use one login on a website that is tied to a single web state. Moreover, changes to the underlying web business logic and native business logic can be made without affecting other components of the application, specifically the translation module. Thus, embodiments of the present disclosure bring greater flexibility to development of applications containing both native business logic and web business logic components.

Figure 1:
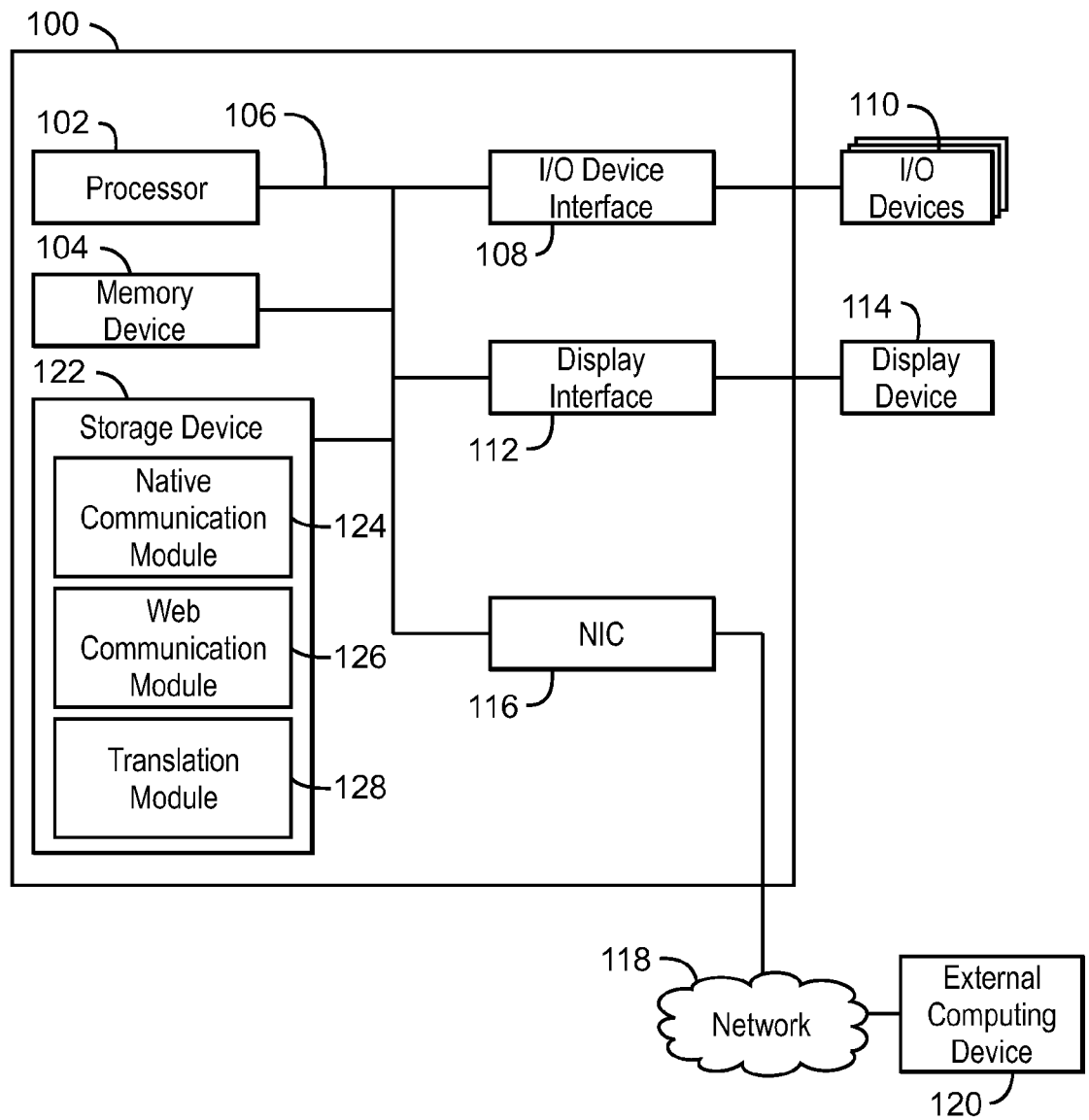
FIG. 1 is block diagram of an example computing device that can process hybrid data in accordance with an embodiment.

With reference now to FIG. 1, an example computing device that can process hybrid data is generally shown in accordance with an embodiment. The computing device 100 may be for example, a server, desktop computer, laptop computer, tablet computer, or smartphone. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices. For example, the modules discussed below may be stored on computing device 100 while one or more server modules may be stored on cloud nodes.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory device 104 can include random access memory (RAM), read only memory (ROM), flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a native communication module 124, a web communication module 126, and a translation module 128. The native communication module 124, the web communication module 126, and the translation module 128 may be run on memory device 104. The native communication module 124 may receive native requests from native business logic as described below. The native communication module may send the requests to a web client. The web communication module 126 may receive web requests from web business logic. In some implementations, the web communication module 126 may send the web requests to a translation module 128 for processing. In some examples, the translation module 128 may translate the web requests into a native code that can be read by the native communication module 124. In some examples, the translation module 128 may send the translated native requests to the native communication module 124 that may send the translated native requests to the web client as described in reference to FIG. 2 below. In some examples, the translation module 128 may operate at a communication layer. For example, a communication layer may be a software abstraction layer corresponding to communication between modules.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.).

Figure 2:
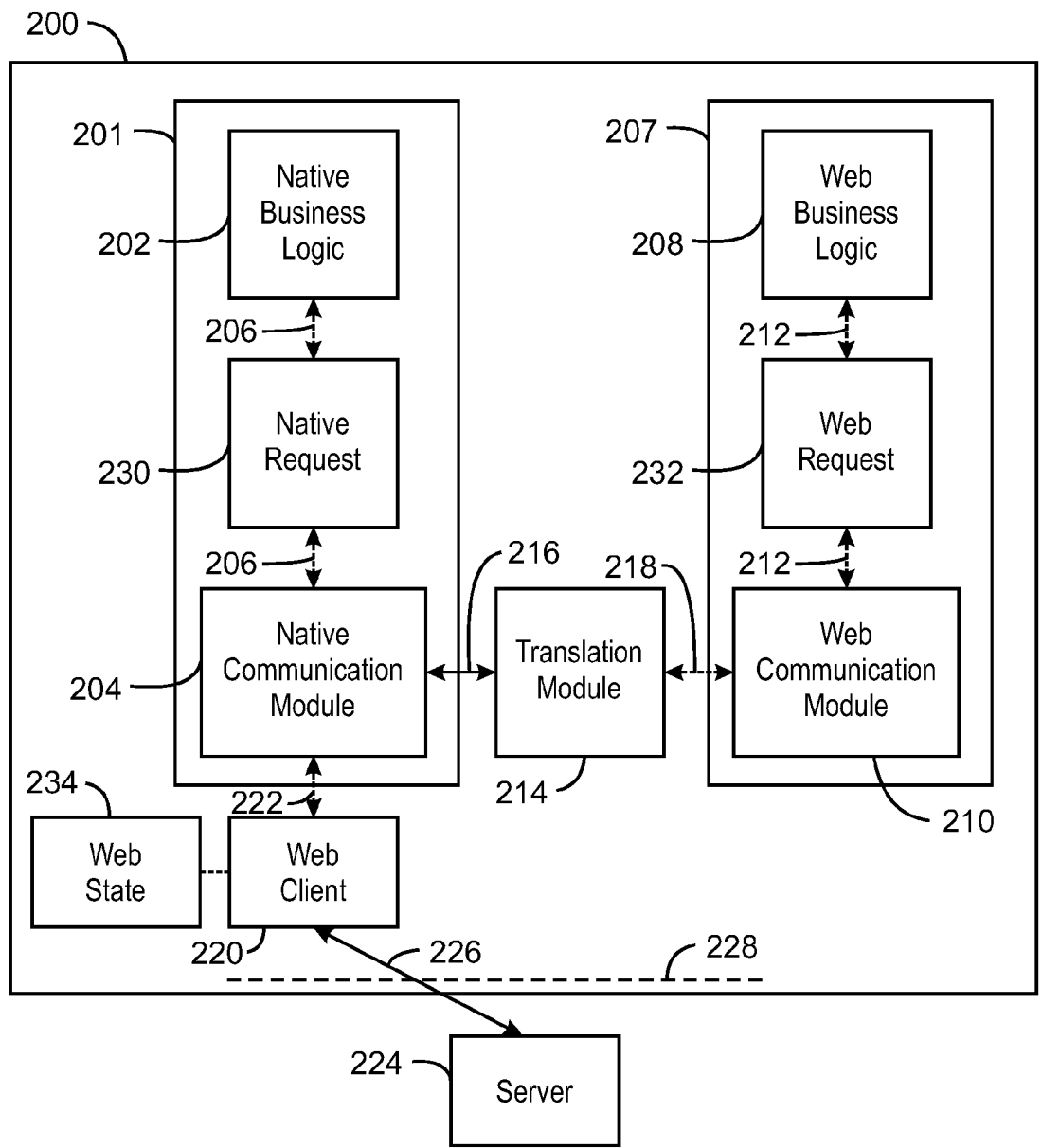
FIG. 2 is a block diagram of an example application for processing hybrid data in accordance with an embodiment.

FIG. 2 is a block diagram of an example application that can process hybrid data in accordance with an embodiment. The example application of FIG. 2 is generally referred to by the reference number 200.

In some embodiments, the example application 200 may include a native code module 201 including native business logic 202 that is communicatively coupled to a native communication module 204 as indicated by arrows 206. The example application 200 may also include a web code module 207 including a web business logic 208 that may be communicatively coupled to a web communication module 210 as indicated by arrows 212. The native communication module 204 may also be communicatively coupled to the web communications module 210 via the translation module 214 as indicated by arrows 216 and 218. The native communication module 204 may also be communicatively coupled to a web client 220 as indicated by arrow 222. The web client 220 may be communicatively coupled to a server 224 as indicated by arrow 226. Application 200 may also be communicatively coupled to server 224 via web client 220. The functionality of application 200 is opaque to server 224, which is indicated by the dotted line 228.

In implementations, the native business logic 202 may send a native request 230 to the native communication module 204 as also indicated by arrows 206. For example, the native request 230 can include a request from the native business logic 202 to retrieve some web content such as a banking profile picture to be displayed in the application 200. In some examples, the web business logic 208 can send a web request 232 to the web communication module 210 as indicated by arrows 212. For example, the web request 232 may include a request to retrieve a bank account balance. In some examples, the web business logic 208 may send the web request 232 in parallel to the native business logic 202 sending the native request 230. In some examples, the web business logic 208 operates independently of the native business logic 202. For example, the code of the web business logic 208 or native business logic 202 may be different technology that can be modified separately without modifying both logic modules. In addition, the translation module is distinct from the business logic layers, and so the business logic modules can be edited without modifying the translation module 214, allowing for greater flexibility and ease of maintenance. The functionality of the translation process is "invisible" to the business logic layers and to the server 224 as indicated by dotted line 228.

Still referring to FIG. 2, in implementations, the web communication module 210 may send the web request 232 to the translation module 214 for processing. In some examples, the translation module 214 enables native to web and web to native communication. For example, the translation module 128 can invoke a web application program interface (API) from native code, or a native API from web code. The translation module 214 may translate the web request 232 into a native code form referred to herein as a translated native request that is readable by the native communicate module 204. For example, the native code can be Java or Objective-C. The translation module 214 may send the translated native request to the native communication module 204 as indicated by arrow 216. In some implementations, the native communication module 204 may send native requests 230 or translated native requests 232 to a web client 220. The web client 220 may include a web state 234. For example, the web state 234 may include data related to the state of the web client 220 such as identifying information such as tokens provided by servers 224 in response to native requests 230 and/or web requests 232, among others. In some examples, the web client 220 may read or update the web state 234 based on the native request 230 and/or the translated native request 232. In some examples, the web client 220 may send the native request 230 or translated native request 232 to one or more servers 224. For example, the server 224 may be a cloud computing node or any appropriate server 224 as described in greater detail with reference to FIG. 3 below. In some examples, the web client 220 may send a token from the web state 234 along with the native request 230 and/or web request 232. For example, the token can be used for authentication.

In some implementations, the server 224 may send a response to the web client 220. For example, after an authentication process between the client 220 and the server 224, the response corresponding to a native request 230 may include an authentication token. The web client may update the web state 234 with the authentication token upon receiving the token with the response from server 224 and send the response to native communication module 204. The native communication module 204 may then send the response corresponding to the native request to the native business logic 202. In some examples, the response may be in response to a request for data. For example, the request for data can be associated with an individual online account, such as profile data, among others. In some examples, the response may correspond to a web request 232. The web client 220 may receive the web request response and read and/or update the web state 234 based on the response. For example, the token received in response to the native request 230 may have expired. The web client 220 may then, after another authentication process, receive a new token from server 224 and store the new token in the web state 234. The web client 220 may then send the response to the native communication module 204. In some examples, the native communication module 204 may detect that the response corresponds to a translated native request 232. The native communication module 204 may send the response corresponding to the web request 232 to the translation module 214. In some examples, the translation module 214 may translate the response into a web format such as JavaScript, among others. The translation module 214 may then send the response to the web communication module 210, which may send the response to the web business logic 208 as described in greater detail in reference to FIG. 4 below. For example, the response to the web request 232 may be any suitable data provided by the server 224 in response to a previous request. For example, the response to the web request 232 may include previously requested account information, among others.

In some examples, a second native request 230 may be sent by the native business logic 202, or native business logic module, before the new token has expired. The web client 220 may provide the unexpired token to the server 224 for authentication. The server 224 may accept the token as authentication and return the response to the second native request 230. The web client 220 may send the response to the native business logic 202 as described above.

It is to be understood that the block diagram of FIG. 2 is not intended to indicate that the example application 200 is to include all of the components shown in FIG. 2. Rather, the application 200 can include fewer or additional components not illustrated in FIG. 2 (e.g., additional modules, etc.).

Figure 3:
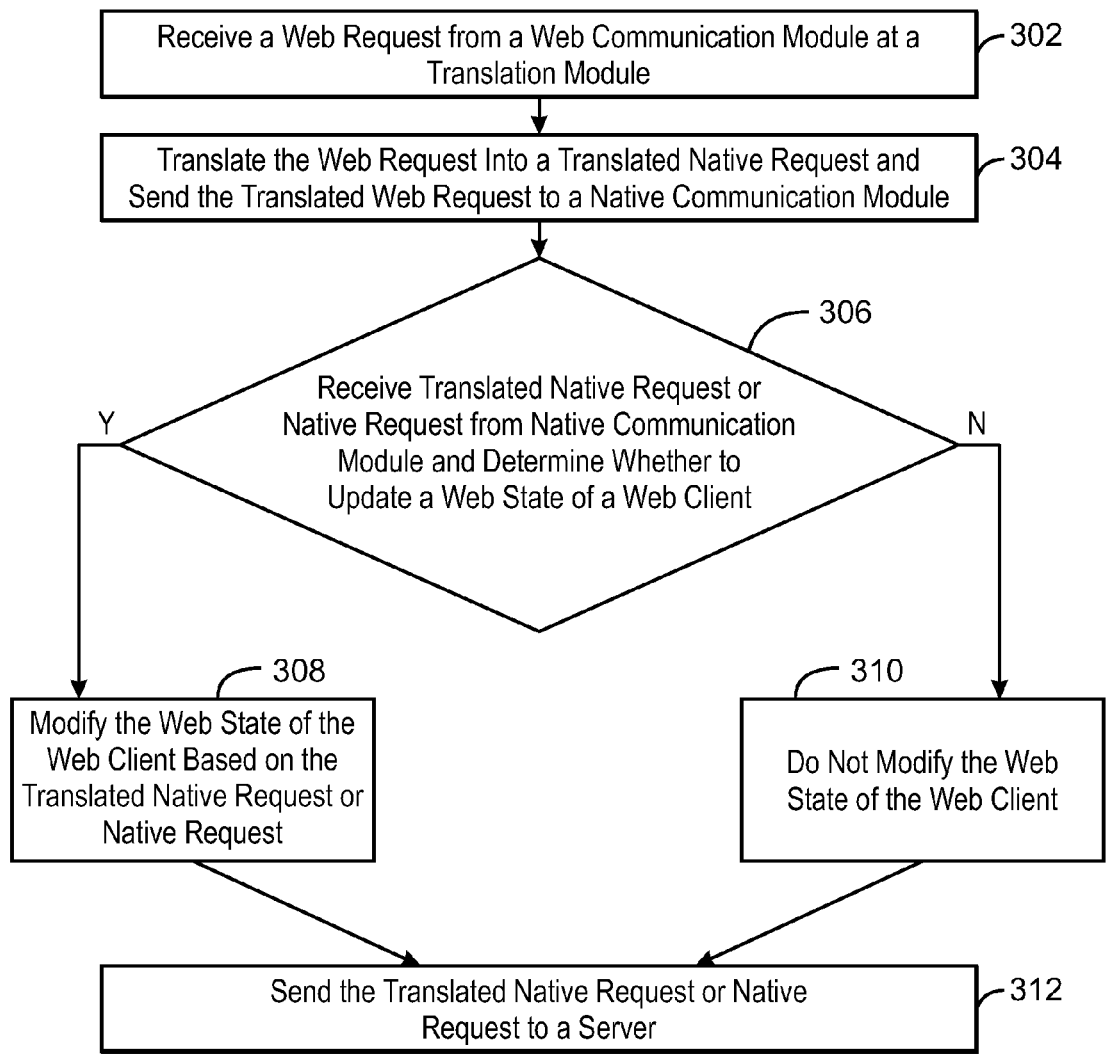
FIG. 3 is a process flow diagram of an example method that can process hybrid data in accordance with an embodiment.

FIG. 3 is a process flow diagram of an example method that can process hybrid data in accordance with an embodiment. The method 300 can be implemented with any suitable computing device, such as the computing device 100 of FIG. 1 and is described with reference to the example application 200 of FIG. 2.

At block 302, a translation module 214 may receive a web request 232 from a web communication module 210. In some examples, the web request 232 may be a request for specific web content. For example, the requested web content may be a bank account balance, news information, or any other form of web content. In some examples, the request may be to upload user content. In some examples, the web request may be in the form of a dynamic programming language such as JavaScript, among others.

At block 304, the translation module 214 may translate the web request into a native code and send the translated native request to a native communication module 204. For example, the native code may be a form of Java, Objective-C, or the like. In some examples, the native code may be based on the operating system.

At block 306, the web client 220 may receive the translated native request or a native request from the native communication module 204 and determine whether to read and/or update a web state 234 of the application. For example, the web request 232 may be a request for account information that uses authentication. The web client 220 may read the web state 234 and determine that no authentication tokens exist. The web client 220 may then send the request to the server 224. If the web client 220 determines that the web state 234 is to be read and/or updated, the process flow continues at block 308. If the web client 220 determines that the web state 234 is not to be read and/or updated, the process flow continues at block 310.

At block 308, the web client 220 may modify the web state 234 of the application based on the translated native request or the native request. For example, the web client 220 may modify web state 234 to include a new token received from server 224 during authentication. In some examples, the web client 220 may also modify web state 234 to include files, such as tokens, that can store or indicate any suitable state information. State information may include information about previous data characters or packets received and may be used to affect the processing of current characters or packets. For example, a token may temporarily store a value indicating an amount of data to be included in a data transfer.

At block 310, the web client 220 does not modify the web state 234 of the web client 220. For example, a web request 232 may not have any action that alters or creates a token. Therefore, the web client 220 may proceed to block 312.

At block 312, the web client 220 may send the translated native request or native request to a server 224. For example, an HTTP GET or POST web request 232 may be sent to a server 224. In some examples, the web request 232 may include an authentication token from the web state 234.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, a similar process may be performed with native requests 230, at blocks 306-312, but without translation of the native request 230 before the native request is received by the native communication module 204. In some examples, other types of requests could also modify the state of the web client.

Figure 4:
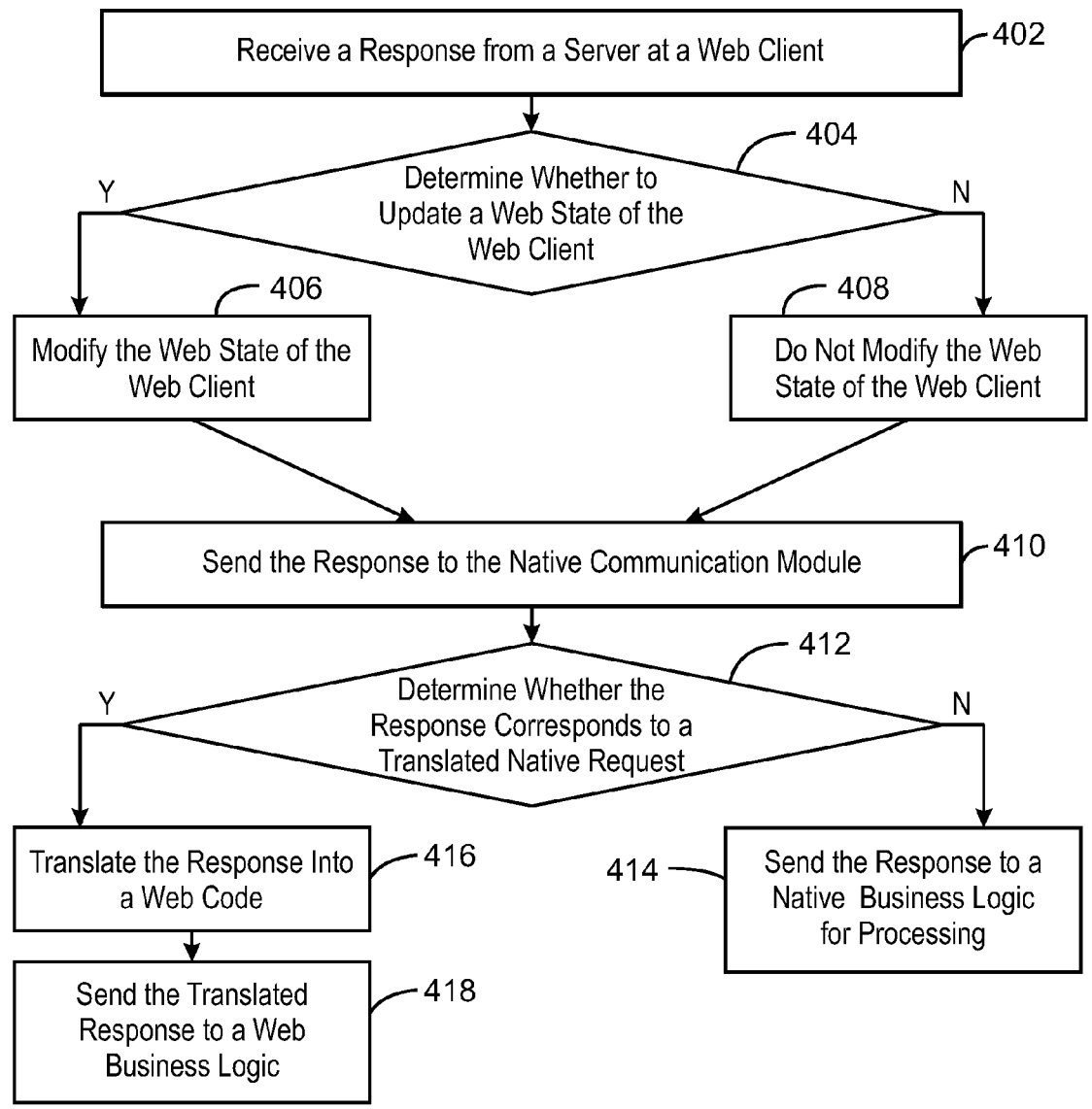
FIG. 4 is a process flow diagram of an example method that can process hybrid data received from a server in accordance with an embodiment.

FIG. 4 is a process flow diagram of an example method that can process hybrid data received from a server in accordance with an embodiment. The method 400 can be implemented with any suitable computing device, such as the computing device 100 of FIG. 1 and is described with reference to example application 200 of FIG. 2.

At block 402, a web client 220 may receive a response from a server 224. In some examples, the response may be a request for authentication. In some examples, the response may include requested content or an authentication token.

At block 404, the web client 220 may determine whether to update a web state 234 of the web client. For example, a response to a request for account information may return a response including a request for authentication, among others. If an update to the web state 234 will be performed, then the method may proceed to block 406. If an update to the web state 234 will not be performed, then the method may proceed to block 408.

At block 406, the web client 220 may modify the web state 234 of the web client 220. For example, the web client 220 may update the web state 234 to include a token received from an authentication. In some examples, the web client 20 may write state information to any other suitable file in the web state 234.

At block 408, the web client 220 may not modify the web state 234 of the web client 220. For example, a response from server 224 may not contain any state information or tokens to be stored in the web state 234.

At block 410, the web client 220 may send the response to the native communication module 204. For example, the web client 220 may send a response containing a requested content to the native communication module 204.

At block 412, the native communication module 204 may determine whether the response corresponds to a translated native request 232. In some examples, the native communication module 204 determines that a 404 response was in response to a translated native request 232 for a particular content on server 224. For example, the communication module 204 can keep track of all previous requests in a table or a data structure. If the native communication module 204 determines the response is to a native request 230 then the method may proceed to block 414. If the native communication module 204 determines the response corresponds to a translated native request 232, then the method may proceed at block 416.

At block 414, the native communication module 204 may send the response to native business logic 202 for processing. For example, the response may correspond with a native request 230 for account information, such as a profile picture, among others. Receiving the response containing the requested account information from the web client 220, the native communication module 204 may send the account information to the native business logic 202 for further processing.

At block 416, the native communication module 204 may send the response to a translation module 214 to translate the response into a web code. For example, the translation module 214 may take a response written in Objective-C, among others and create a response in a dynamic language such as JavaScript, among others.

At block 418, the translation module 214 may send the translated response to web business logic 208. The web business logic 208 may further process the translated response. For example, the web business logic 208 may send the translated response in JavaScript to a user interface for display.

The process flow diagram of FIG. 4 is not intended to indicate that the operations of the method 400 are to be executed in any particular order, or that all of the operations of the method 400 are to be included in every case. For example, a response corresponding to a native request 230 may be received by the web client 220 in which case blocks 416 and 418 may not be performed. Additionally, the method 400 can include any suitable number of additional operations.

The present invention may be a system, a method and/or computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
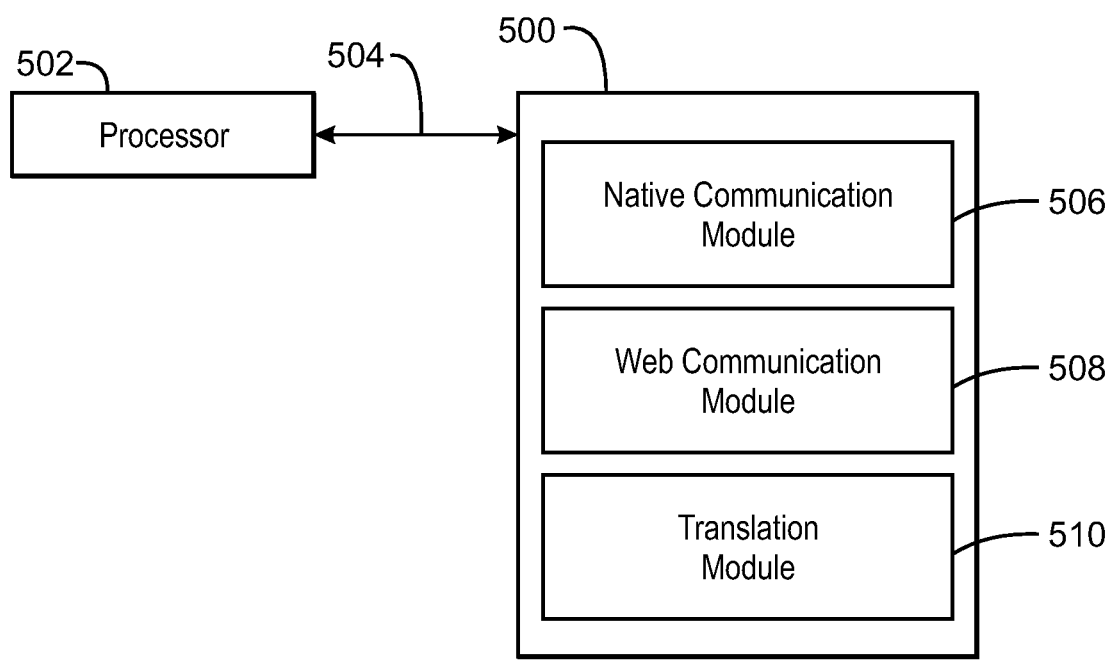
FIG. 5 is an example tangible, non-transitory computer-readable medium that can process hybrid data in accordance with an embodiment.

Referring now to FIG. 5, a block diagram is depicted of an example tangible, non-transitory computer-readable medium 500 that can process hybrid data in accordance with an embodiment. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a native communication module 506 can include instructions to send native requests for processing at a web client. In some embodiments, a web communication module 508 can include instructions to send web requests to a translation module 510. The translation module 510 can include instructions to receive the web requests and translate the web requests. The translation module 510 can send the translated native requests to the native communication module 506. The native communication module 506 can also contain instructions to send translated native requests to and receive responses from a web server. The native communication module 506 can include instructions to determine whether the responses correspond to translated native requests. In some examples, the native communication module 506 includes instructions to send the response to the translation module if the response corresponds to a translated native request. In some examples, the translation module 510 includes instructions to translate the response and send the response to a web business logic. In some examples, the native communication module 506 includes instructions to send the response to a native business logic for processing if the response does not correspond to the translated native request. In some examples, the web request is created by a web business logic and the native request is created by an independently modifiable native business logic. In some examples, the native communication module 506 can include instructions to update a web state based on the translated native request and the response to the translated native request.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 5 may be included within the tangible, non-transitory, computer-readable medium 500, depending on the specific application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving a web request;
   translating the web request into a translated native request;
   sending, via a single web client, the translated native request and a native request to a server;
   receiving, via the single web client, a response from the server; and
   determining whether the response corresponds to the translated native request or to the native request.

2. The method of claim 1, wherein the web request is received from a web business logic that is functionally independent of a native business logic.

3. The method of claim 2, wherein the web business logic or the native business logic can be modified without modifying both the web business logic and the native business logic.

4. The method of claim 1, further comprising sending the translated native web request to the single web client using a native communication module.

5. The method of claim 1, further comprising modifying a state of the web client based on the translated native request or the native request.

6. The method of claim 5, further comprising further modifying the state of the web client based on the response from the server.

7. The method of claim 1, further comprising receiving a response to a native request from the server at the web client and forwarding the response to a native business logic.

\* \* \* \* \*